United States Patent [19]

Jogand

[11] 4,249,995
[45] Feb. 10, 1981

[54] LIQUID-METAL COOLED REACTOR WITH PRACTICALLY STATIC INTERMEDIATE ZONE

[75] Inventor: Patrick Jogand, Aix en Provence, France

[73] Assignee: Commissariat a l'Energie Atomique, Paris, France

[21] Appl. No.: 918,368

[22] Filed: Jun. 23, 1978

[30] Foreign Application Priority Data

Jul. 4, 1977 [FR] France .................. 77 20488
Jun. 5, 1978 [FR] France .................. 78 16713

[51] Int. Cl.³ ........................... G21C 19/28
[52] U.S. Cl. ......................... 176/65; 176/40
[58] Field of Search ............... 176/40, 65, 87

[56] References Cited

U.S. PATENT DOCUMENTS

| | | | |
|---|---|---|---|
| 3,324,007 | 6/1967 | Baxter | 176/40 |
| 3,937,653 | 2/1976 | Leheu | 176/65 X |
| 3,962,032 | 6/1976 | Berniolles et al. | 176/65 |
| 4,022,656 | 5/1977 | Durston et al. | 176/87 X |
| 4,087,325 | 5/1978 | Chevallier et al. | 176/65 |
| 4,101,377 | 7/1978 | Berniolles et al. | 176/40 |
| 4,113,562 | 9/1978 | Jones | 176/40 |

Primary Examiner—Peter A. Nelson

[57] ABSTRACT

In a fast reactor constituted by an open-topped main vessel containing liquid metal coolant and an inner vessel mounted within the main vessel, a transverse skew wall forming an inner vessel extension is associated with a baffle which extends above the skew wall. A space formed between the baffle and the skew wall and containing a practically static volume constitutes a thermal shield between the hot liquid metal located within the inner vessel above the baffle and the cold liquid metal located between the inner vessel and the main vessel beneath the skew wall.

9 Claims, 5 Drawing Figures

LIQUID-METAL COOLED REACTOR WITH PRACTICALLY STATIC INTERMEDIATE ZONE

This invention relates to a nuclear reactor, especially a liquid-metal cooled fast reactor, and is primarily concerned with a particular arrangement of a first vessel or so-called inner vessel which contains the reactor core. Said inner vessel has a lateral skew wall which forms a separation between the volume of hot liquid metal discharged from the reactor core and collected within said inner vessel and the liquid metal which is cooled as it passes through heat exchangers arranged in spaced relation around the core. After cooling, said liquid metal is returned into the space located between said inner vessel and the wall of a second vessel or so-called main vessel which surrounds the inner vessel and contains all the internal reactor components.

The general structural characteristics of a liquid-metal cooled fast reactor corresponding to an integrated reactor-block arrangement are well known in the technique. In this type of reactor, which includes the liquid metal fast breeder reactor of French design known as Super Phenix, the reactor core is formed by an array of fuel assemblies maintained in the vertical position by engagement of their bottom end-fittings in a core support diagrid. An inner vessel which contains the reactor core is surrounded by an open-topped main vessel and this latter is suspended from a reactor vault roof of substantial thickness. The cavity or reactor vault which is closed by the roof is formed within a shield structure which is usually of concrete and forms an outer containment for the installation. The main vessel contains a suitable volume of liquid metal which usually consists of sodium and is circulated upwards through the reactor core within the inner vessel and in contact with the fuel assemblies. The hot sodium which has absorbed the heat produced by nuclear fission within the fuel assemblies is collected at the top of said inner vessel, then directed towards heat-exchanger inlet ports. The heat exchangers are suspended vertically from the reactor vault roof in such a manner as to extend downwards to a point of immersion below the level of liquid metal. After passing through the heat exchangers, the cooled sodium is discharged from the lower ends of these latter into the space formed between the inner vessel and the main vessel, then distributed between said vessels and recycled by circulating pumps which are also suspended from the reactor vault roof and spaced at intervals around the reactor core between the heat exchangers. Said pumps then return the cold sodium into the core support diagrid at a sufficient pressure to permit a further passage through the reactor core and thus to produce a continuous circulation.

In accordance with an arrangement which is conventional in this type of integrated reactor, the volumes of hot sodium within the inner vessel and of cold sodium between said inner vessel and the main vessel are separated by a transverse skew wall constituting an extension of the lateral wall of the inner vessel, said skew wall being traversed in leak-tight manner by the bodies of components such as the pumps and heat exchangers in particular. In the case of these latter, the hot sodium inlet ports are located above the skew wall and the cold sodium outlet ports are located beneath this latter.

In accordance with French Pat. No. 2,220,847, the peripheral edge of the skew wall is bent-back towards the bottom of the main vessel and joined to this latter or to a structure which extends in a direction parallel to the main vessel wall, thus forming a total separation between the cold sodium region and the hot sodium region. The shape which is thus adopted for the edge of the skew wall makes it possible in particular to eliminate the presence of zones of stagnant sodium beneath the skew wall while avoiding the creation of harmful stresses and at the same time offering a high degree of mechanical strength. It is not possible, however, to eliminate the effects of thermal shocks produced during variations in operating regime, especially at the time of reactor shutdown.

This invention relates to a liquid-metal cooled nuclear reactor comprising an open-topped main vessel having a vertical axis and containing the liquid metal, an inner vessel mounted within the main vessel, and an inner vessel extension in the form of a transverse skew wall provided with a downwardly bent edge joined to the main vessel or to a structure connected to said main vessel. The shape and arrangement of the skew wall are such as to achieve enhanced mechanical strength and also to ensure continuous thermal protection of said skew wall by producing an appreciable drop in temperature. This accordingly permits of a considerable reduction in the stresses developed in the skew wall at the different operating regimes.

To this end, the reactor under consideration is distinguished by the fact that the skew wall is associated with a baffle which extends above said skew wall and delimits with this latter a space containing a practically static volume which forms a thermal screen between the hot liquid metal located within the inner vessel above the baffle and the cold liquid metal located between the inner vessel and the main vessel beneath the skew wall.

As an advantageous feature, the skew wall has the shape of a portion of a torus of revolution about the axis of the main vessel and is joined by means of conical walls on the one hand to the inner vessel and on the other hand to the main vessel or to the structure which is connected to said main vessel.

In a first embodiment of the invention, the baffle which is placed above the skew wall is horizontal and rests on stationary bearing members. In a first alternative form of this embodiment, the baffle consists of a single unit which is supported on stationary bearing members by means of sliding contacts. In another alternative form, the baffle is constituted by adjacent sectors in juxtaposed relation and provided successively with overlapping edges for ensuring continuity of the baffle, each sector being joined to one of the cylindrical sleeves through which a pump or heat exchanger is intended to pass. Preferably, the baffle is provided with circumferential ribs for facilitating the absorption of thermal stresses during operation.

In accordance with a second embodiment, the baffle is self-supporting and inclined towards the axis of the main vessel, said baffle being provided with an extension in the form of a lateral and vertical bearing shell placed within the inner vessel. Depending on requirements, the sloping side portions of the baffle are bent downwards or raised in a direction parallel to the axis of the main vessel in order to ensure confinement of the space in which the liquid metal is conveyed between the skew wall and the baffle as well as insulation of said space with respect to the hot liquid metal within the inner vessel.

Finally, in another alternative form, the baffle has a horizontal surface which rests freely on stationary bearing members and is provided on its internal and external peripheries as well as at the point of penetration by each cylindrical sleeve with a downwardly-extending side portion which is immersed in the liquid metal and traps a blanket layer of neutral gas beneath the horizontal surface.

Further distinctive features of a liquid-metal cooled reactor provided with a transverse skew wall associated with a baffle for constituting a thermal screen in accordance with the invention will become further apparent from the following description of a number of exemplified embodiments which are given by way of indication without any limitation being implied, reference being made to the accompanying drawings, in which.

Figure 1:
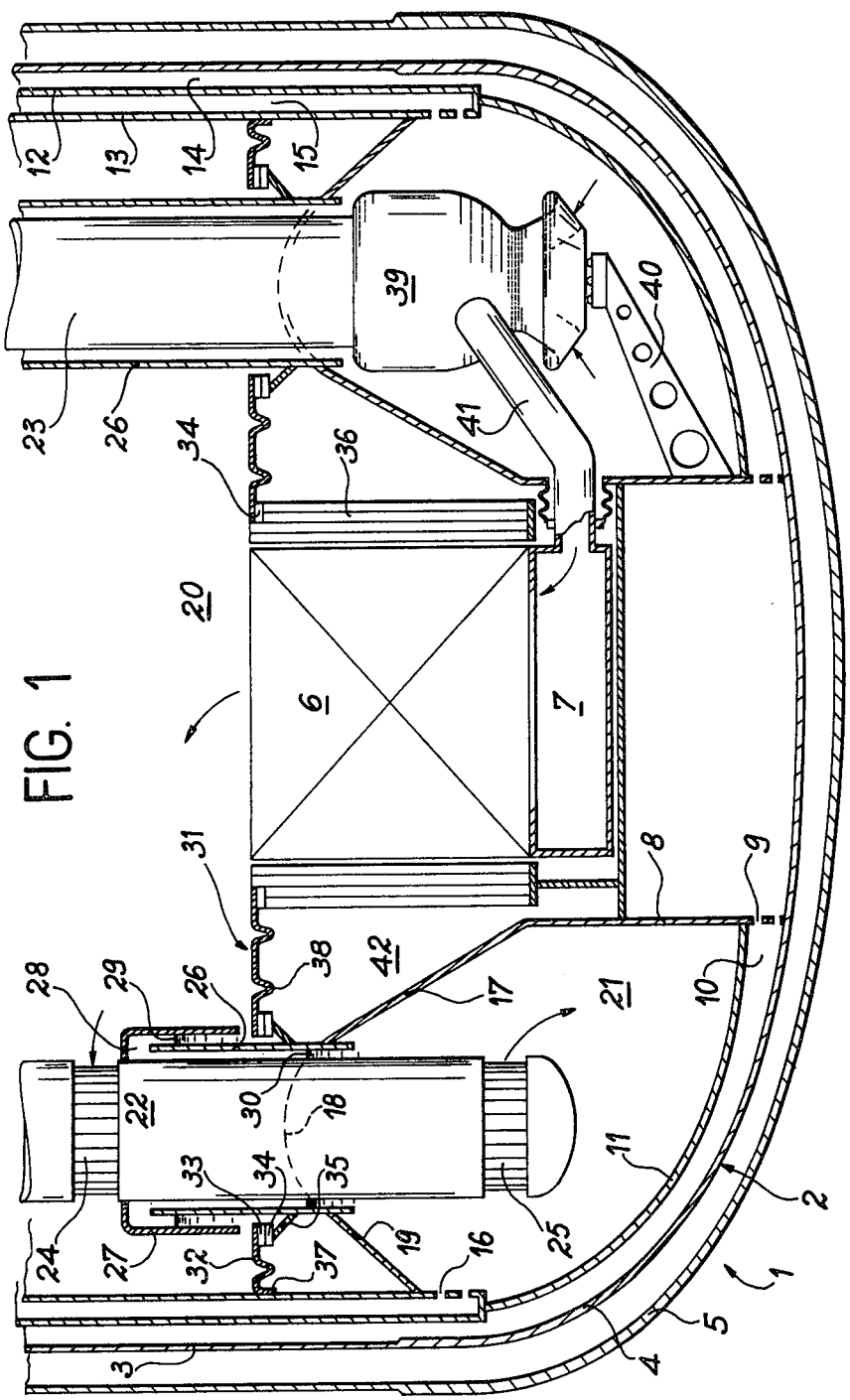
FIG. 1 is a diagrammatic view in partial transverse cross-section showing the lower portion of a liquid-metal cooled fast reactor vessel and of the essential structures contained in said vessel, and illustrating in particular the transverse skew wall associated with a baffle in accordance with a first embodiment of the invention.

In the example shown in FIG. 1, the reference numeral 1 generally designates the lower portion of a fast nuclear reactor which is cooled by a liquid metal. Said reactor comprises in particular a main vessel 2 which is open at the top portion (not shown) and constituted by a lateral cylindrical shell 3 which terminates in a substantially hemispherical bottom wall 4. The main vessel 2 is surrounded externally in known manner by a second vessel 5 having a parallel wall or so-called safety vessel.

The reactor core 6 is placed within the main vessel 2 beneath the level (not shown) of the liquid metal contained within this latter and rests on a core support diagrid 7 which is applied against the bottom wall 4 of the vessel 2 by means of a support structure 8. The reactor core and diagrid support structure 8 are completely immersed in the liquid metal contained in the main vessel 2 and usually consisting of sodium. This volume of liquid metal is also supplied through holes 9 formed in the base of the diagrid support structure 8 to a narrow annular space 10 formed first between the bottom wall 4 of the main vessel 2 and a sheet metal member 11 which is parallel to this latter, then extends opposite to the lateral cylindrical shell 3 by means of two parallel walls 12 and 13 which define two spaces 14 and 15. During reactor operation, the main vessel 2 is cooled by the flow of liquid metal which is circulated upwards within the space 14, then downwards within the space 15. At the bottom of the space 15, this coolant flow is discharged through holes 16 formed in the wall 13 in order to return to the volume contained within the main vessel 2.

In accordance with an arrangement which is also conventional, the reactor core 6 is placed within an inner vessel, the lateral wall 17 of which has a substantially conical contour in the example of construction under consideration in order to be joined tangentially to a portion of torus 18 which extends annularly around the axis of the reactor core and of the main vessel. This portion of torus 18 which forms a skew wall is extended by a second conical portion 19 which is bent downwards and joined to the wall 13 of the cooling structure which forms an internal jacket for the lateral cylindrical shell 3 of the main vessel. Under these conditions, the skew wall 18 and its conical extensions 17 and 19 separate the volume of liquid metal within the main vessel 2 into two regions 20 and 21 respectively which are located in one case above said skew wall and in the other case below this latter.

The nuclear reactor shown in FIG. 1 corresponds to a general arrangement known in the technique as an integrated design. Provision is accordingly made for a series of heat exchangers 22 and circulating pumps 23 placed within the interior of the main vessel 2 and disposed at suitable intervals around the reactor core 6 in such a manner that the bodies of said heat exchangers and of said pumps extend vertically through the skew wall 18 which forms a separation between said regions 20 and 21.

Each heat-exchanger body 22 is provided with inlet ports or windows 24 located in the region 20 above the skew wall 18 and outlet windows 25 provided beneath said skew wall in the region 21 between the inner vessel 17 and the main vessel 2. The skew wall 18 is traversed by each body of the heat exchangers 22 or pumps 23 through wells each constituted by a cylindrical sleeve 26 which surrounds the heat-exchanger or pump body and is welded to the skew wall. In the case of the heat exchanger, said sleeve is in turn covered by a bell-cap 27 connected to the heat exchanger and forming a space 28 in which is trapped a suitable quantity of neutral blanket gas. The levels of liquid metal inside and outside the sleeve 26 are in communication respectively with the regions 20 and 21 and are represented in the drawing by the references 29 and 30.

In accordance with the invention, the baffle 18 together with its conical extensions 17 and 19 towards the inner vessel and the main vessel is associated with a baffle 31 designed in the form of a single and substantially horizontal sheet metal plate 32 as shown in the example of construction of FIG. 1. Said baffle is provided with sliding contacts or shoes 33 which rest on bearing members of the L-section type, for example, these latter being rigidly fixed either to a support bracket 35 extending from the outer surface of the cylindrical sleeve 26 or provided at the top of the lateral neutron shield 36 which surrounds the reactor core 6 within the inner vessel. The plate 32 is provided at its periphery with a bent-back edge 37 which leaves a small clearance space with respect to the wall 13. Finally, the plate 32 is advantageously provided with circumferential ribs 38 for absorbing thermal shocks and especially for reducing stresses within the baffle at the time of variations in operating regime. During reactor operation, the liquid metal which has passed upwards through the reactor core 6 is collected within the region 20 within the inner vessel above the skew wall 18, then penetrates into the heat-exchanger bodies 22 through their inlet windows 24. After cooling, said liquid metal is discharged from said heat exchangers through the windows 25 and collected within the region 21 beneath the skew wall 18, between the inner vessel and the main vessel. In this region, the cooled liquid metal is recirculated by the pumps 23. After suction through the diffusers 39 of said pumps which are supported by beams 40, the liquid metal is returned into the diagrid 7 through large-section ducts 41, then undergoes a further passage through the reactor core 6, thus maintaining a continuous circulation.

By positioning the baffle 31 above the skew wall 18, there is thus defined with this latter an internal region 42 which is capable of constituting an effective thermal screen during operation by virtue of the quantity of liquid metal which is contained within this region and remains practically static. Furthermore, the use of sliding bearing members permits of free expansion of the baffle whilst the ribs 38 formed in this latter ensure a reduction of thermal stresses. Finally, the solution which is contemplated offers great simplicity of construction and is of very limited overall size.

Figure 2:
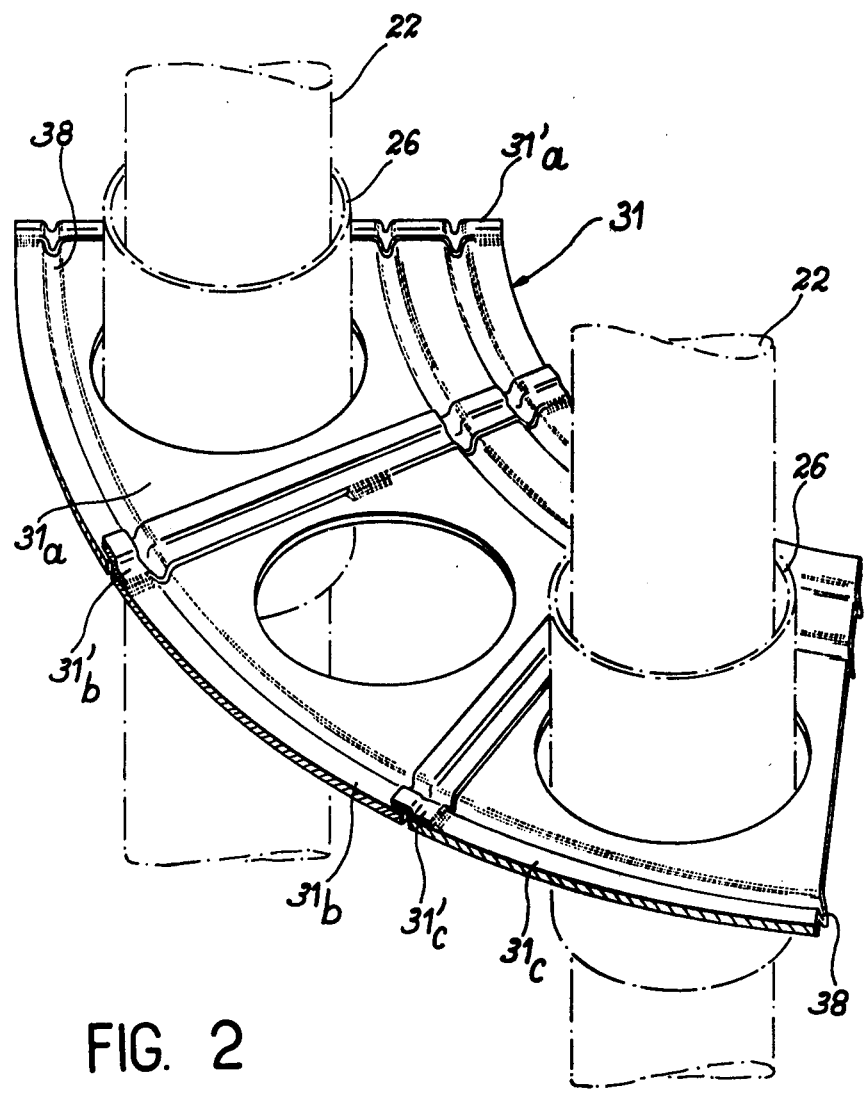
FIG. 2 illustrates an alternative form of the embodiment shown in FIG. 1.

FIG. 2 illustrates an alternative form of the embodiment described in the foregoing in which the baffle 31 is no longer designed as a single unit as in the previous embodiment but is constituted by adjacent sectors 31a, 31b, 31c..., each sector being joined to a cylindrical sleeve 26 in which a pump body or heat-exchanger body passes through the baffle and the skew wall. Preferably, these sectors are provided with edges 31'a, 31'b, 31'c,..., which overlap successively in order to ensure continuity of the baffle. In this alternative form, there are again shown the circumferential ribs 38 in the form of circular undulations which are intended to endow the baffle with the necessary degree of flexibility by virtue of the inherent elasticity of said ribs.

Figure 3:
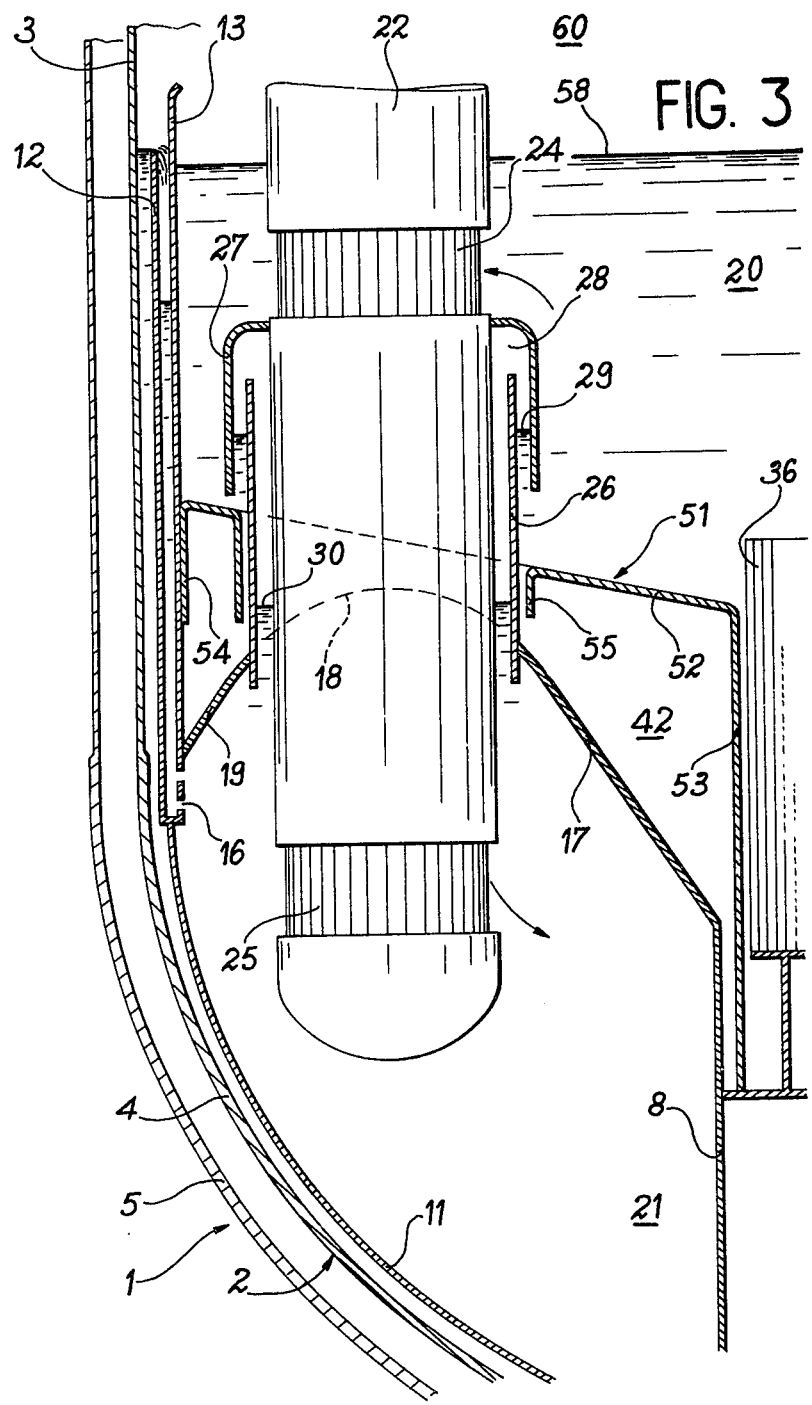
FIG. 3 is a detail transverse sectional view to a larger scale showing a first alternative form of a second embodiment.

In the first alternative form of a second embodiment shown in FIG. 3, the elements which were already illustrated in FIG. 1 are again shown partially. In this variant, the baffle 51 is self-supporting and has a flat portion 52 which is inclined towards the axis of the main vessel and rests on a lateral cylindrical shell 53 which is mounted within the inner vessel and the lower end of which in turn rests on the diagrid support structure 8. At the opposite end which is directed towards the periphery, the baffle 51 has a downwardly-extending side portion 54 which leaves a narrow clearance space with respect to the wall 13. In order to confine the volume within the region 42, the baffle 51 is also provided with a flange 55 opposite to each of the skirts 26 through which the bodies of the heat exchangers or pumps 22 and 23 traverse the skew wall 18. Both the flange 55 and the downwardly-extending side portion 54 extend to the bottom level of the baffle in order to prevent circulation of liquid metal by natural convection. In this embodiment as in the previous form of construction, the liquid metal contained between the skew wall and the baffle remains practically stagnant during operation.

Figure 4:
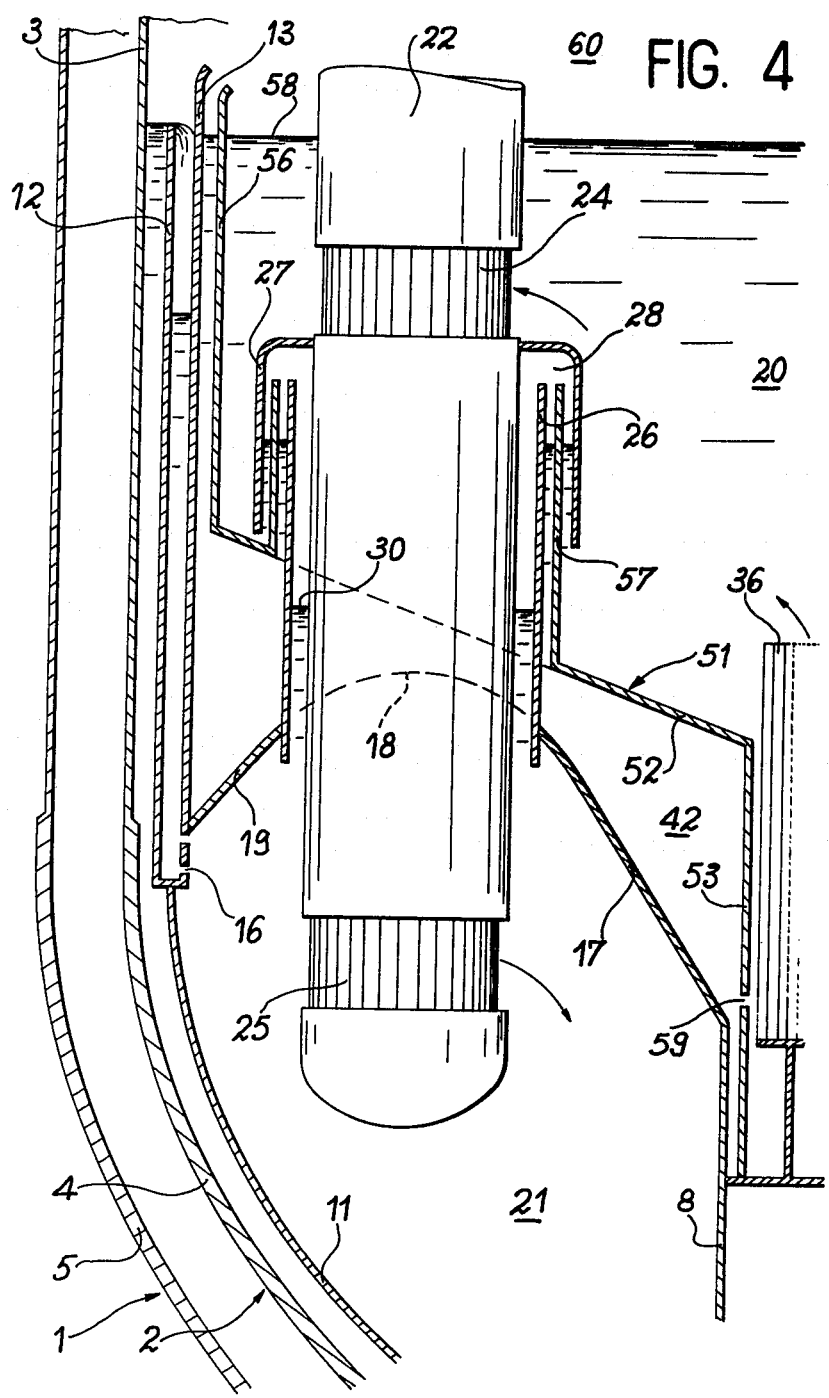
FIG. 4 is a transverse sectional view of a second alternative form of said second embodiment.

In a second alternative form of the second embodiment shown in FIG. 4, the baffle 51 is again self-supporting as in the alternative embodiment shown in FIG. 3 and also has a portion 52 which is inclined towards the axis of the main vessel. In this variant, the baffle is arranged as indicated hereinafter with a view to ensuring leak-tightness between the regions 42 and 20. The baffle 51 is provided at its periphery with an upwardly-directed side portion 56 which extends parallel to the wall 13 to the neutral gas atmosphere 60 located above the free level 58 of liquid metal. The baffle 51 is also provided with a side portion which is similar to the side portion 56 around each of the penetrations (not shown) provided in the skew wall 18 for the cylindrical sleeves 26 which surround the pump bodies. At the point of penetration of the skew wall 18 by the heat-exchanger bodies 22, the baffle 51 is provided with a side wall 57 which extends upwards and terminates in the neutral gas space 28. The foregoing arrangements make it possible to prevent any circulation between the region 42 located between the skew wall and the baffle and the region 20 containing the hot sodium. Equalizing of pressures between the region 20 and the confined region 42 is obtained by means of orifices 59 formed in the lower portion of the cylindrical shell 53 which supports the baffle 51.

Figure 5:
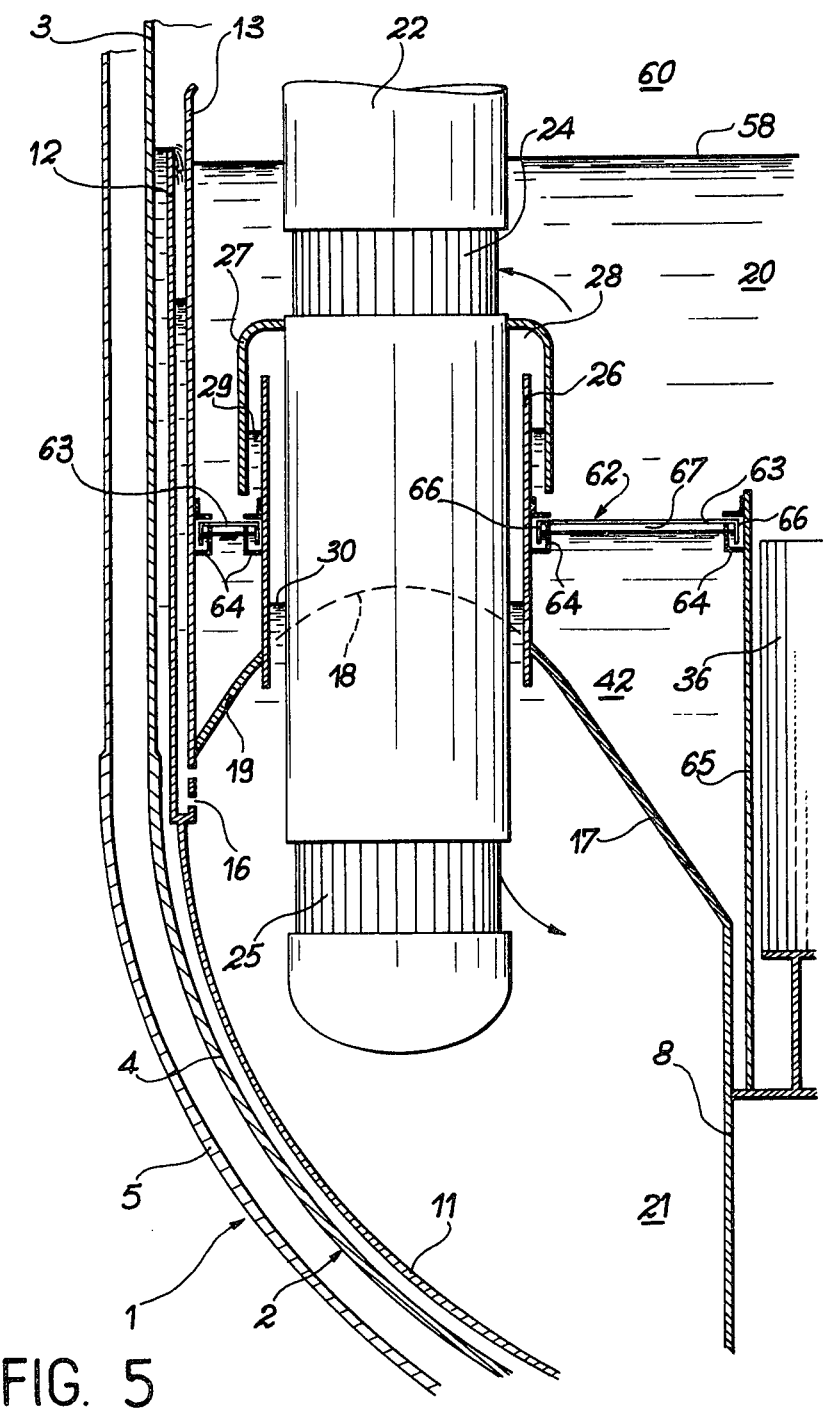
FIG. 5 illustrates another alternative form of construction.

FIG. 5 illustrates another alternative embodiment in which the baffle associated with the skew wall is mounted in a floating arrangement. In this alternative embodiment, the baffle 62 has a flat surface 63 which extends horizontally above the skew wall 18. This surface rests on supports such as those designated by the reference 64 and formed in the wall 13 on the side nearest the main vessel or in a cylindrical shell 65 on the side nearest the reactor core, or alternatively in the external surface of the cylindrical sleeves 26 through which the pump and heat-exchanger bodies traverse the skew wall. The surface 63 of the baffle is provided with downwardly-bent side portions 66 extending beneath the level of the liquid metal which is trapped within the supports 64, thus confining beneath the baffle a blanket layer 67 of suitable neutral gas such as argon or helium.

By virtue of these arrangements, total leak-tightness is accordingly obtained between the volume of hot liquid metal above the baffle and the volume of colder liquid metal located beneath this latter, thus permitting an appreciable reduction in friction forces at the time of differential radial expansions of the baffle. Finally, the presence of the gas blanket ensures more efficient thermal insulation and serves to lower the temperature of the practically static volume of liquid metal between the baffle and the skew wall. 9n

I claim:

1. A liquid-metal cooled nuclear reactor comprising an open-topped main vessel having a vertical axis and containing liquid metal, a reactor core, an inner vessel mounted and coaxial within the main vessel, and an inner vessel extension in the form of a transverse skew wall provided with a downwardly-bent edge joined to a structure connected to said main vessel, said skew wall being transversed by cylindrical sleeves providing a leak-tight passage for the bodies of pumps and heat exchangers disposed at intervals around the reactor core, a baffle extending above said skew wall and delimiting therewith a space containing a practically static volume of liquid metal which forms a thermal screen between hot liquid metal located within the inner vessel above said baffle and cold liquid metal located between the inner vessel and the main vessel beneath said skew wall.

2. A liquid-metal cooled reactor according to claim 1, wherein the skew wall has the shape of a portion of a torus of revolution about the axis of the main vessel and has an inner and an outer edge and is joined by means of conical walls to the inner vessel at its inner edge and to the structure which is connected to said main vessel at its outer edge.

3. A liquid-metal cooled reactor according to claim 1, wherein the baffle has a horizontal surface which rests freely on stationary bearing members and is provided on its internal and external peripheries as well as at the point of penetration by each cylindrical sleeve with a downwardly-extending side portion which is immersed in the liquid metal and traps a blanket layer of neutral gas beneath the horizontal surface of said baffle.

4. A liquid-metal cooled reactor according to claim 1 or 2, wherein the baffle is constituted by a single unit supported on the stationary bearing members by means of sliding contacts.

5. A liquid-metal cooled reactor according to claim 4, wherein the baffle is constituted by adjacent sectors in juxtaposed relation and provided successively with overlapping edges for ensuring continuity of the baffle, each sector being joined to one of the cylindrical sleeves through which a pump or heat exchanger is intended to pass.

6. A liquid-metal cooled reactor according to claim 4, wherein the baffle is provided with circumferential ribs.

7. A liquid-metal cooled reactor according to claim 1 or claim 2, wherein the baffle is self-supporting and inclined towards the axis of the main vessel, said baffle being provided with an extension in the form of a lateral and vertical bearing shell placed within the inner vessel.

8. A liquid-metal cooled reactor according to claim 7, wherein the baffle is provided at its periphery and around the sleeves with downwardly-directed side portions extending parallel to the axis of the main vessel to the bottom level of the baffle, said side portions delimiting a plurality of annular spaces with lower ends which open into the hot liquid metal located above the baffle and within the space containing the volume which forms a thermal screen.

9. A liquid-metal cooled reactor according to claim 7, wherein the baffle is provided at its periphery and around the sleeves with upwardly-directed side portions extending parallel to the axis of the main vessel, said side portions delimiting a plurality of annular spaces with upper ends which open into a gaseous atmosphere located above the hot liquid metal, orifices being also formed in the lower portion of the bearing shell which supports the baffle.

* * * * *